United States Patent
Lee et al.

(10) Patent No.: US 12,095,033 B2
(45) Date of Patent: Sep. 17, 2024

(54) SOLID ELECTROLYTE MEMBRANE, METHOD FOR MANUFACTURING SAME, AND METHOD FOR SELECTING SOLID ELECTROLYTE MEMBRANE

(71) Applicant: LG ENERGY SOLUTION, LTD., Seoul (KR)

(72) Inventors: Jung-Pil Lee, Daejeon (KR); Eun-Bee Kim, Daejeon (KR); Eun-Kyung Mok, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 687 days.

(21) Appl. No.: 17/295,941

(22) PCT Filed: Mar. 19, 2020

(86) PCT No.: PCT/KR2020/095045
§ 371 (c)(1),
(2) Date: May 21, 2021

(87) PCT Pub. No.: WO2020/190120
PCT Pub. Date: Sep. 24, 2020

(65) Prior Publication Data
US 2022/0013809 A1   Jan. 13, 2022

(30) Foreign Application Priority Data

Mar. 19, 2019  (KR) .......................... 10-2019-0031407
Mar. 17, 2020  (KR) .......................... 10-2020-0032753

(51) Int. Cl.
*H01M 10/0565*  (2010.01)
*H01M 10/0525*  (2010.01)
(Continued)

(52) U.S. Cl.
CPC ... *H01M 10/0565* (2013.01); *H01M 10/0525* (2013.01); *H01M 10/058* (2013.01);
(Continued)

(58) Field of Classification Search
None
See application file for complete search history.

(56) References Cited

U.S. PATENT DOCUMENTS

2001/0038948 A1* 11/2001 Jacobs .............. H01M 10/0565
429/304
2009/0226816 A1   9/2009 Yoshida et al.
(Continued)

FOREIGN PATENT DOCUMENTS

CN    108711603 A    10/2018
CN    101768770 A     5/2024
(Continued)

OTHER PUBLICATIONS

Machine Translation of JP 2015153460A (Year: 2015).*
(Continued)

Primary Examiner — Gregg Cantelmo
(74) Attorney, Agent, or Firm — Birch, Stewart, Kolasch & Birch, LLP (57) ABSTRACT

Methods for manufacturing a solid electrolyte membrane are provided, which allow visual determination of how much a porous sheet is filled with a solid electrolyte material, and thus can optimize selection of materials and manufacturing processes of a solid electrolyte membrane in a simple manner. The resulting solid electrolyte membrane can reduce the manufacturing cost and allow easy deformation, and thus can be processed with ease when it is applied to batteries having various shapes. Further, since the solid electrolyte membrane according to the present disclosure includes a composite of a porous polymer material, such as
(Continued)

a nonwoven web, with a solid electrolyte material, it has excellent strength and allows formation of a thin film, and thus provides a battery with improved energy density advantageously.

8 Claims, 3 Drawing Sheets

(51) Int. Cl.
| | |
|---|---|
| *H01M 10/058* | (2010.01) |
| *H01M 10/42* | (2006.01) |
| *H01M 50/403* | (2021.01) |
| *H01M 50/409* | (2021.01) |
| *H01M 50/414* | (2021.01) |
| *H01M 50/431* | (2021.01) |
| *H01M 50/446* | (2021.01) |
| *H01M 50/491* | (2021.01) |
| *H01M 50/497* | (2021.01) |

(52) U.S. Cl.
CPC ..... *H01M 10/4235* (2013.01); *H01M 50/403* (2021.01); *H01M 50/409* (2021.01); *H01M 50/414* (2021.01); *H01M 50/431* (2021.01); *H01M 50/446* (2021.01); *H01M 50/491* (2021.01); *H01M 50/497* (2021.01); *H01M 2300/0068* (2013.01); *H01M 2300/0071* (2013.01); *H01M 2300/0082* (2013.01); *H01M 2300/0088* (2013.01); *H01M 2300/0094* (2013.01)

(56) References Cited

U.S. PATENT DOCUMENTS

| | | | |
|---|---|---|---|
| 2011/0250495 A1* | 10/2011 | Webber | H01M 10/488 429/188 |
| 2016/0276717 A1* | 9/2016 | Goldsmith | H01M 10/0565 |
| 2017/0005356 A1* | 1/2017 | Zimmerman | B01J 47/12 |
| 2019/0001650 A1 | 1/2019 | Sohn et al. | |
| 2019/0237747 A1 | 8/2019 | Cho et al. | |

FOREIGN PATENT DOCUMENTS

| | | |
|---|---|---|
| JP | 2010-277821 A | 12/2010 |
| JP | 5528995 B2 | 6/2014 |
| JP | 2015-153460 A | 8/2015 |
| JP | 2017-103146 A | 6/2017 |
| JP | 2018-101641 A | 6/2018 |
| KR | 10-2014-0000997 A | 1/2014 |
| KR | 10-2015-0041364 A | 4/2015 |
| KR | 10-2016-0042859 A | 4/2016 |
| KR | 10-2018-0125408 A | 11/2018 |
| KR | 10-1946381 B1 | 2/2019 |

OTHER PUBLICATIONS

Machine Translation of KR 20160042859B (Year: 2016).*
Machine Translation of JP 2017103146A (Year: 2017).*
International Search Report (PCT/ISA/210) issued in PCT/KR2020/095045 mailed on Jul. 22, 2020.
European Search Report for Appl. No. 20774255.2 dated Mar. 14, 2022.

* cited by examiner

SOLID ELECTROLYTE MEMBRANE, METHOD FOR MANUFACTURING SAME, AND METHOD FOR SELECTING SOLID ELECTROLYTE MEMBRANE

TECHNICAL FIELD

The present application claims priority to Korean Patent Application No. 10-2019-0031407 filed on Mar. 19, 2019 and Korean Patent Application No. 10-2020-0032753 filed on Mar. 17, 2020 in the Republic of Korea. The present disclosure relates to an electrolyte membrane for an all-solid-state battery, an all-solid-state battery including the electrolyte membrane and a method for manufacturing the electrolyte membrane.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, polymeric solid electrolyte, oxide-based solid electrolyte and sulfide-based solid electrolyte materials are used as solid electrolyte materials. When free-standing type electrolyte membranes are manufactured by using such solid electrolyte materials alone, defects, such as tearing or cracking, or separation of the electrolyte materials, may occur during the manufacture or use of batteries. In addition, when such a solid electrolyte material is applied to a lithium metal battery as an electrolyte membrane material, the electrolyte membrane may be damaged by lithium dendrite formed from the negative electrode to cause a failure in insulation between the negative electrode and the positive electrode, resulting in a short-circuit. To prevent the above-mentioned problem, there has been suggested a method for manufacturing a solid electrolyte membrane by filling a porous sheet, such as a nonwoven web or film made of a porous material, with a solid electrolyte material to form a composite of a solid electrolyte material with a porous sheet. However, in the case of such a composite-type solid electrolyte membrane, there is a problem in that it is difficult to determine whether or not the pores of the porous sheet are filled with the solid electrolyte material sufficiently. Particularly, in the case of a conventional polymeric solid electrolyte, it has high light transmission property and is clear, and thus it is not easy to determine this by the naked eyes. Therefore, there is a need for developing a solid electrolyte membrane using a polymeric solid electrolyte having a novel composition and an all-solid-state battery using the same in order to realize excellent electrochemical characteristics of an all-solid-state battery.

DISCLOSURE

Technical Problem

The present disclosure is designed to solve the problems of the related art, and therefore the present disclosure is directed to providing a solid electrolyte membrane including a porous sheet filled with a solid electrolyte material. The present disclosure is also directed to providing a method for manufacturing the solid electrolyte membrane including a porous sheet filled with a solid electrolyte material. In addition, the present disclosure is directed to providing a method for determining how much a porous sheet is filled with a solid electrolyte material in a visual manner. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art, and thus the present disclosure relates to a solid electrolyte membrane, a method for manufacturing the same, a method for selecting processing conditions for manufacturing a solid electrolyte membrane by using the solid electrolyte membrane, and a method for selecting a solid electrolyte membrane using the solid electrolyte membrane.

According to an embodiment of the present disclosure, there is provided a solid electrolyte membrane including a solid electrolyte material, a dye and a porous polymer sheet, wherein the porous polymer sheet is a porous material including a plurality of pores, the pores may be penetrated through by flowable materials, the solid electrolyte material and the porous polymer sheet form a composite in such a manner that the pores of the porous polymer sheet may be filled with a mixture of the solid electrolyte material with the dye, and how much the porous polymer sheet is filled with the solid electrolyte material is determined visually by the color development characteristics of the dye.

According to the second embodiment of the present disclosure, there is provided the solid electrolyte membrane as defined in the first embodiment, wherein the solid electrolyte material includes at least one of a polymeric solid electrolyte, an oxide-based solid electrolyte and a sulfide-based solid electrolyte.

According to the third embodiment of the present disclosure, there is provided the solid electrolyte membrane as defined in the second embodiment, wherein the polymeric electrolyte material is formed by adding a polymer resin to a solvated lithium salt and shows an ion conductivity of $1.0 \times 10^{-5}$ S/cm or more.

According to the fourth embodiment of the present disclosure, there is provided the solid electrolyte membrane as defined in the second embodiment, wherein the porous polymer sheet is a nonwoven web.

According to the fifth embodiment of the present disclosure, there is provided the solid electrolyte membrane as defined in any one of the first to the fourth embodiments, wherein the dye includes a natural dye, a synthetic dye, a fluorescence dye, or two or more of them.

According to the sixth embodiment of the present disclosure, there is provided a method for manufacturing the solid electrolyte membrane as defined in any one of the first to the fifth embodiments, including the steps of: (S10) preparing a porous polymer sheet and at least one solid electrolyte film; (S20) disposing the solid electrolyte film on the surface of the porous polymer sheet; and (S30) carrying out pressurization in such a manner that the solid electrolyte film may be pressed into the porous polymer sheet, wherein the solid electrolyte film includes a mixture of a polymeric solid electrolyte with a dye, and the polymeric solid electrolyte includes the polymeric electrolyte material formed by adding a polymer resin to a solvated lithium salt and shows an ion conductivity of $1.0 \times 10^{-7}$ S/cm or more, and the porous polymer sheet is a nonwoven web.

According to the seventh embodiment of the present disclosure, there is provided a method for manufacturing the solid electrolyte membrane as defined in any one of the first to the fifth embodiments, including the steps of: (S100) preparing a dispersion containing a solid electrolyte material and a dye; (S200) filling the pores of the porous polymer sheet with the dispersion; and (S300) drying the product of step (S200).

According to eighth embodiment of the present disclosure, there is provided the method as defined in the sixth or the seventh embodiment, which further includes step (S400) of determining amount and behavior of the solid electrolyte material filling the pores of the porous polymer sheet in a visual manner.

According to ninth embodiment of the present disclosure, there is provided the method as defined in the eighth embodiment, which further includes step (S500) of selecting a material and processing condition for manufacturing a solid electrolyte membrane.

According to tenth embodiment of the present disclosure, there is provided the method as defined in the eighth embodiment, wherein step (S400) is used as step of selecting a solid electrolyte membrane to be applied to a battery.

Advantageous Effects

The method for manufacturing a solid electrolyte membrane according to the present disclosure allows visual determination of how much a porous sheet is filled with a solid electrolyte material, and thus can optimize selection of materials and manufacturing processes of a solid electrolyte membrane in a simple manner. In addition, the solid electrolyte membrane obtained by applying the materials and manufacturing process selected by the above-mentioned determination method can reduce the manufacturing cost and allow easy deformation, and thus can be processed with ease when it is applied to batteries having various shapes. Further, since the solid electrolyte membrane according to the present disclosure includes a composite of a porous polymer material, such as a nonwoven web, with a solid electrolyte material, it has excellent strength and allows formation of a thin film, and thus provides a battery with improved energy density advantageously.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to an electrolyte membrane for an all-solid-state battery and an all-solid-state battery including the same. In addition, the present disclosure relates to a method for manufacturing the electrolyte membrane. The all-solid-state battery according to the present disclosure allows thin filming of a solid electrolyte membrane to a thickness of about 100 μm or less, and thus provides high ion conductivity and high battery energy density. In addition, the solid electrolyte membrane has high strength despite its small thickness, and thus is less damaged during the manufacturing process or use of a battery.

Figure 1:
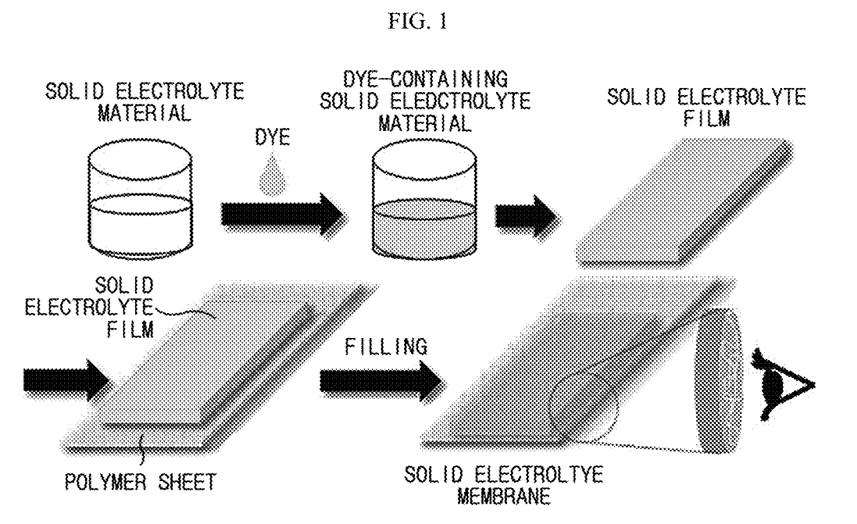
FIG. 1 is a flow chart schematically illustrating the method for manufacturing a solid electrolyte membrane and method for selecting a solid electrolyte membrane according to an embodiment of the present disclosure.

FIG. 1 is a schematic view illustrating the solid electrolyte membrane and method for manufacturing the same according to an embodiment of the present disclosure. Herein, the present disclosure will be explained in more detail with reference to the accompanying drawings.

The solid electrolyte membrane according to the present disclosure includes a solid electrolyte material, a dye and a porous polymer sheet having a plurality of pores, wherein the pores of the porous polymer sheet are filled with a mixture containing the solid electrolyte material and dye.

The polymer sheet is a porous material including a plurality of pores and includes a polymer material. According to an embodiment of the present disclosure, the polymer sheet may include a polymer film formed by melting, extruding and orienting a polymer material through a dry process, a polymer film obtained by extracting a plasticizer through a wet process to form pores, a nonwoven web obtained by melting, spinning and compressing a polymer material, a laminate sheet including two or more layers of them, or the like. For example, the polymer sheet may be a nonwoven web.

In the porous polymer sheet, a plurality of pores is formed, wherein the pores are interconnected with one another and penetrate through the substrate from one surface to the other surface so that flowable materials may pass through the pores. Any organic material or inorganic material having electrical insulation property may be used as a material for forming the porous polymer sheet. According to an embodiment of the present disclosure, the polymer sheet may include at least one polymer resin, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

According to an embodiment of the present disclosure, the porous sheet may have a thickness of about 5-500 μm. The thickness may be selected suitably within the above-defined range, considering the thickness of the finished electrolyte membrane and strength of the solid electrolyte membrane. For example, the porous sheet may have a thickness of 300 μm or less, 200 μm or less, or 100 μm or less, within the above-defined range. If the thickness of the porous sheet is less than the above-defined range, it is difficult to obtain a desired level of strength of the solid electrolyte membrane. If the sheet has an excessively large thickness, it is difficult to control the thickness to a desired level, even when applying a pressurization process.

In addition, according to an embodiment of the present disclosure, the porous polymer sheet may have a porosity of about 10-90% and the pore size may be controlled suitably within a range of 50 nm to 500 μm. For example, the pore size may be 400 μm or less, 300 μm or less, 200 μm or less, or 100 μm or less, within the above-defined range. The porosity range and pore size range may be selected suitably within the above-defined ranges in such a manner that the porous polymer sheet may retain the electrolyte film in an amount sufficient to function as an electrolyte membrane in the porous sheet and may not interrupt press-fitting of the electrolyte film having low flowability into the sheet, while maintaining adequate ion conductivity and mechanical strength. In other words, as porosity is increased, ion conductivity may be improved but mechanical strength may be degraded. In addition, as pore size is increased, durability or an effect of inhibiting lithium dendrite growth may be degraded. In addition, as the pore size or porosity is increased, press-fitting of the electrolyte film may be facilitated.

Meanwhile, according to an embodiment of the present disclosure, the solid electrolyte may include a polymeric solid electrolyte, an oxide-based solid electrolyte material, a sulfide-based solid electrolyte material, or a mixture of two or more of them.

The polymeric solid electrolyte is a composite of a lithium salt with a polymer resin, i.e. a polymeric electrolyte material formed by adding a polymer resin to a solvated lithium salt, and may show an ion conductivity of about $1 \times 10^{-7}$ S/cm or more, more preferably about $1 \times 10^{-5}$ S/cm or more.

According to an embodiment of the present disclosure, the polymer resin has a molecular weight (Mw) of about 5,000-5,000,000, and a polymer resin having a smaller molecular weight has higher flowability, and thus facilitates a press-fitting process.

As described hereinafter, the solid electrolyte membrane according to the present disclosure is obtained by forming a polymer electrolyte into the form of a film and press-fitting it into a porous sheet, or by impregnating a porous sheet with a dispersion containing a polymer material. When the above-mentioned conditions are satisfied, press-fitting may be carried out with ease. According to an embodiment of the present disclosure, the polymer resin is one satisfying the above-mentioned conditions and may include a thermoplastic polymer material. Otherwise, non-limiting examples of the polymer resin may include at least one selected from a polyether polymer, polycarbonate polymer, acrylate polymer, polysiloxane polymer, phosphazene polymer, polyethylene derivatives, alkylene oxide derivatives, such as polyethylene oxide, phosphate polymer, polyagitation lysine, polyester sulfide, polyvinyl alcohol, polyvinylidene fluoride and a polymer containing an ionically dissociable group. In addition, particular examples of the polymeric electrolyte include at least one selected from a branched copolymer including polyethylene oxide (PEO) backbone copolymerized with a comonomer including an amorphous polymer, such as PMMA, polycarbonate, polysiloxane (pdms) and/or phosphazene, comb-like polymer and a crosslinked polymer resin.

In the electrolyte according to the present disclosure, the lithium salt is an ionizable lithium salt and may be represented by $Li^+X^-$. The anion ($X^-$) of lithium salt is not particularly limited and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

The sulfide-based solid electrolyte contains sulfur (S), has conductivity of metal ions that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$F_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, or the like. However, the scope of the present disclosure is not limited thereto.

In addition, the oxide-based solid electrolyte contains oxygen (O), has conductivity of metal ions that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \le x \le 1$, $0 \le y \le 1$), $LiAl_xZr_{2-x}(PO_4)_3$ (wherein $0 \le x \le 1$, $0 \le y \le 1$), $LiTi_xZr_{2-x}(PO_4)_3$ (wherein $0 \le x \le 1$, $0 \le y \le 1$), LISICON compounds, UPON compounds, perovskite compounds, NASICON compounds and LLZO compounds. However, the scope of the present disclosure is not limited thereto.

The dye is not particularly limited, and any material having color developing property may be used, as long as it allows visual determination of amount of the solid electrolyte filling the pores of the porous sheet and behavior of the solid electrolyte material distributed in the porous sheet through a visual method or an optical method, such as an analysis method using a spectrochemical instrument. The dye may include a natural dye, a synthetic dye, or both. The natural dye includes orcein, saffron, or the like. The synthetic dye includes anthraquinone, an azo-based compound, methane, o-nitroarylamine, quinophthalone, indigo-based dye, sulfate dye, diphenylmethane dye, triphenylmethane dye, pyrazolone dye, thiazole dye, xanthene dye, azine dye, oxazine dye, thiazine dye, acridine dye, cyanine dye, ink products for escribulators, or the like. In addition, the dye may include a fluorescence material having fluorescence property. Particular examples of the fluorescence material include naphthalene, anthracene, phenanthrene, tetracene, perylene, terylene, quaterylene, pentarylene, hexalylene, naphtolactam, azlactone, methine, acridine, or the like. According to an embodiment of the present disclosure, the above-exemplified ingredients may be used alone or in combination as dye.

As described above, the porous sheet is filled with the solid electrolyte. Thus, it is possible to form a thin film of the solid electrolyte membrane, while not causing degradation of the strength of the solid electrolyte membrane. In addition, it is possible to determine the amount of the solid electrolyte filling the porous sheet or behavior of the solid electrolyte distributed in the porous sheet by checking the color development of the dye.

According to the present disclosure, the solid electrolyte membrane has a thickness of about 100 μm or less, preferably about 10-90 μm. Within the above-defined range, the solid electrolyte membrane may have a suitable thickness, considering ion conductivity, physical strength, energy density of an applicable battery, or the like. For example, in terms of ion conductivity or energy density, the thickness may be 80 μm or less, 70 μm or less, 60 μm or less, or 50 μm or less. Meanwhile, in terms of physical strength, the thickness may be 20 μm or more, 30 μm or more, or 40 μm or more. In addition, the solid electrolyte membrane may have a tensile strength of about 500-2,000 $kgf/cm^2$, while it has the above-defined range of thickness. Further, the solid electrolyte membrane may have a porosity of 15 vol % or less, or about 10 vol % or less.

According to an embodiment of the present disclosure, the solid electrolyte membrane may be obtained by preparing an electrolyte film by using a polymeric electrolyte material, disposing the electrolyte film on the surface of the polymer sheet, and carrying out pressurization in such a manner that the electrolyte film may be pressed into the polymer sheet and the pores of the polymer sheet may be filled with the polymeric electrolyte.

Hereinafter, the method for manufacturing a solid electrolyte film having the above-described characteristics will be explained in detail. The solid electrolyte according to the present disclosure may be obtained by various methods. Typically, a slurry impregnation method and a film press-fitting method will be described in detail hereinafter.

(1) Dispersion Impregnation Method

This method includes preparing a dispersion containing a solid electrolyte material and a dye, and impregnating a porous sheet with the dispersion. The dispersion may be prepared by introducing the solid electrolyte material and dye to a suitable solvent. Then, the porous sheet is impregnated with the dispersion or the dispersion is applied to the porous sheet so that the dispersion may be introduced into the pores of the porous sheet. To accelerate introduction of the dispersion into the pores of the porous sheet, a supplement step of pressurizing the sheet may be further carried out after the impregnation or application. The application method is not particularly limited, and particular examples thereof include known methods, such as coating using a doctor blade, bar coater or applicator, spray coating, electrostatic painting, brush coating, electrostatic printing or electrospray deposition, aerodeposition coating, or the like. After that, the porous sheet impregnated with the dispersion may be dried to obtain a solid electrolyte membrane.

According to the present disclosure, the solvent may include N-methyl-2-pyrrolidone (NMP), ethanol, acetonitrile, methyl ethyl ketone (MEK), toluene, heptane, or the like. The method for preparing the dispersion or carrying out drying is not particularly limited, and any known method may be used.

(2) Film Press-Fitting Method

When a polymeric solid electrolyte is used as a solid electrolyte material, a solid electrolyte membrane may be obtained by preparing an electrolyte film and press-fitting the electrolyte film to a porous sheet.

First, an electrolyte film is prepared (S10). The electrolyte film may be prepared as follows. A polymeric electrolyte and dye are mixed with a solvent to prepare slurry for forming an electrolyte film. The solvent may be selected suitably depending on the solid electrolyte material to be used. For example, when an alkylene oxide-based electrolyte, such as polyethylene oxide (PEO), is used as a polymer resin, acetonitrile may be used as a solvent. According to an embodiment of the present disclosure, the slurry may have a solid content of about 1-20 wt %. Herein, the slurry may be present at room temperature or may be warmed to a temperature of 30-80° C. to accelerate homogeneous mixing of the solvent with the polymeric electrolyte.

Next, the slurry is applied to a release sheet, such as a terephthalate film, and molded into the shape of a film having a desired thickness. The application and molding may be carried out by using a known coating process, such as doctor blade coating. Then, the molded film is dried to remove the solvent and to obtain an electrolyte film.

The obtained electrolyte film is disposed on the surface of a porous polymer sheet, such as a nonwoven web, and pressurization is carried out to press the electrolyte film into the sheet (S20). Herein, a release film, such as a terephthalate film, may be disposed on the surface of the electrolyte film in order to protect the surface of the electrolyte film and to prevent the surface of the pressurization member from being contaminated with the electrolyte material. The pressurization may be carried out by using at least one device, such as a roll press, uniaxial press or a jig. Herein, it is possible to provide the electrolyte membrane with a suitable thickness and/or porosity by controlling the processing conditions, such as a press, roller, jig interval, applied pressure and temperature.

According to an embodiment of the present disclosure, the pressurization may be carried out by using a pressurization member selected suitable from known pressurization members, such as a uniaxial press, hot press, roll press, jig, or the like. Herein, the pressurization member may be further provided with a separate heating member so that the surface of the member facing the electrolyte film may be heated. When the electrolyte film is heated by the pressurization member in the above-mentioned manner and has increased softness, it is possible to press the electrolyte film well into the sheet even under a relatively low pressure condition.

Meanwhile, according to an embodiment of the present disclosure, the electrolyte film may be warmed to room temperature (25° C.) to 180° C., before it is introduced to the press-fitting process after its preparation, in order to increase the softness of the material and to accelerate introduction of the electrolyte film into the pores of the polymer sheet. The warming method is not limited to a particular method, but may be carried out by allowing the film to stand in an oven warmed to a predetermined temperature for several hours.

According to an embodiment of the present disclosure, the porous polymer sheet may be provided to a surface modification process in order to increase the hydrophilicity or hydrophobicity of the surface, before it is introduced to the press-fitting process. For example, when PEO is used as a polymer film, the porous polymer sheet may be subjected to hydrophilic surface modification treatment in order to increase the affinity with PEO. When the affinity with the electrolyte material pressed into the sheet is increased in the above-mentioned manner, it is possible to accelerate press-fitting of the electrolyte film into the porous sheet and to increase the adhesion of the electrolyte film with the porous sheet. The hydrophilic surface modification treatment is not limited to a particular method. For example, it may be carried out by a suitable method selected from the known methods, such as UV irradiation, plasma treatment, acid treatment, ozone treatment, or the like.

In addition to the above-described methods, the solid electrolyte membrane may be obtained by mixing powder of a solid electrolyte material with powder of a dye, applying the resultant mixed powder to the surface of a porous sheet, and carrying out pressurization to press the powder of materials into the pores of the porous sheet.

According to the solid electrolyte membrane obtained by the above-described methods, it is possible to determine how the porous sheet is filled with the solid electrolyte in a visual manner through the color development of the dye. When a solid electrolyte membrane is manufactured without introduction of a dye, it is difficult to determine the amount and distribution of the solid electrolyte filling the porous sheet in a visual manner. Therefore, in order to determine the quality of the finished solid electrolyte membrane, the only option is indirect determination through an electrochemical method, such as measurement of ion conductivity. However, according to the solid electrolyte membrane and method for manufacturing the same disclosed herein, it is possible to determine the solid electrolyte impregnation efficiency in a visual manner without a need for using electrochemical measurement. For example, it is possible to determine the degree of electrolyte impregnation and behavior of the solid electrolyte distributed in the porous sheet immediately by the naked eyes during the manufacture of the solid electrolyte membrane.

For example, the above-described method for manufacturing a solid electrolyte membrane may be applied to at least one of the following two processes.

(1) Establishment of Process for Manufacturing Solid Electrolyte Membrane

First, the method for manufacturing a solid electrolyte membrane may be used for selection of materials forming the solid electrolyte membrane. For example, various solid electrolyte materials may be applied to the method in order to select solid electrolyte materials to be used, and applicable materials may be selected. In addition, the method may be used for selection of ingredients of the porous sheet, pore size, porosity and physical strength of the porous sheet, or the like. Further, the solid electrolyte membrane may be used for determination of a suitable combination of materials required for manufacturing a solid electrolyte membrane having desired characteristics.

Additionally, the method may be used for setting the processing conditions when manufacturing a solid electrolyte membrane. The method for manufacturing a solid electrolyte membrane may be used for setting various processing conditions, such as concentration, viscosity and temperature of a dispersion, impregnation method, time, temperature, or the like, which allow production of a solid electrolyte membrane including the solid electrolyte material introduced well into the pores and having a high impregnation ratio.

In other words, the method for manufacturing a solid electrolyte membrane according to the present disclosure is characterized in that the process of introducing a dye and forming a solid electrolyte membrane is repeated to determine suitable materials and processing conditions, and then the selected conditions are applied to a method for manufacturing a solid electrolyte membrane.

(2) Determination of Defect in Manufacture of Electrolyte Membrane

Meanwhile, the method for manufacturing a solid electrolyte membrane according to the present disclosure and a solid electrolyte membrane obtained thereby may be applied to determine a ratio of defects after manufacturing solid electrolyte membranes. Finished solid electrolyte membranes are observed in a visual manner. Then, when a solid electrolyte membrane is not filled with an electrolyte sufficiently or has vacant spaces not filled with an electrolyte, after the observation, it may not be applied to manufacture of a battery but classified as one to be discarded. In other words, the solid electrolyte membrane and method for manufacturing the same according to the present disclosure are advantageous in that a solid electrolyte membrane to be discarded can be determined not through an electrochemical method but through a simple method.

In another aspect of the present disclosure, there is provided an all-solid-state battery including the above-described solid electrolyte membrane. The all-solid-state battery includes a positive electrode, a negative electrode and a solid electrolyte membrane.

According to the present disclosure, each of the positive electrode and the negative electrode may include a current collector and an electrode active material layer formed on at least one surface of the current collector, wherein the electrode active material layer may include a plurality of electrode active material particles and a solid electrolyte. In addition, the electrode active material layer may further include at least one of a conductive material and a binder resin, if necessary. Additionally, the electrode active material layer may further include various additives in order to supplement or improve the physicochemical properties of the electrode.

According to the present disclosure, in the case of a negative electrode active material, any material used conventionally as a negative electrode active material for a lithium ion secondary battery may be used. For example, the negative electrode active material may include at least one selected from: carbon such as non-graphitizable carbon, graphitic carbon, or the like; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \le 1$; $1 \le y \le 3$; $1 \le z \le 8$); lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may include a carbonaceous material and/or Si.

In the case of a positive electrode, the electrode active material may be any material used conventionally as a positive electrode active material for a lithium ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, the electrode active material layer may include at least one additive, such as an oxidation stabilizing additive, reduction stabilizing additive, flame retardant, heat stabilizer, anti-fogging agent, or the like, if necessary According to the present disclosure, the solid electrolyte material may include at least one of a polymeric solid electrolyte, oxide-based solid electrolyte and a sulfide-based solid electrolyte.

According to the present disclosure, different solid electrolytes may be used for the positive electrode, negative electrode and the solid electrolyte membrane, or the same solid electrolyte may be used for two or more battery elements. For example, in the case of a positive electrode, a polymeric electrolyte having excellent oxidation stability may be used as a solid electrolyte. In addition, in the case of a negative electrode, a polymeric electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ s/cm or more, or $10^{-5}$ s/cm or more, may be used with no particular limitation.

According to the present disclosure, the polymeric electrolyte may be a solid polymeric electrolyte formed by adding a polymer resin to a solvated lithium salt, or a polymeric gel electrolyte formed by impregnating a polymer resin with an organic electrolyte containing an organic solvent and a lithium salt.

Herein, reference will be made to the above description of the solid electrolyte membrane about the polymeric electrolyte.

The sulfide-based solid electrolyte contains sulfur (S), has ion conductivity of metals that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, or the like.

In addition, the oxide-based solid electrolyte contains oxygen (O), has ion conductivity of metals that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \le x \le 1$, $0 \le y \le 1$), $LiAl_xZr_{2-x}(PO_4)_3$ (wherein $0 \le x \le 1$, $0 \le y \le 1$), $LiTi_xZr_{2-x}(PO_4)_3$ (wherein $0 \le x \le 1$, $0 \le y \le 1$), LISICON compounds, LIPON compounds, perovskite compounds, NASICON compounds and LLZO compounds.

In still another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Example 1

First, polyethylene oxide (PEO, Mw=4,000,000 g/mol) was dissolved in acetonitrile (AN) as a solvent to prepare a polymer solution having a concentration of 4 wt %. Herein, LiTFSI as a lithium salt was further introduced so that the molar ratio of [EO]/[Li$^+$] might be 18/1. The polymer solution was agitated overnight at 70° C. so that PEO and lithium salt might be dissolved therein sufficiently. Next, an additive solution containing an initiator and a curing agent was prepared. The curing agent was PEGDA (Mw=575) and the initiator was benzoyl peroxide (BPO), wherein polyethylene diacrylate (PEGDA) was used at 20 wt % based on PEO, BPO was used at 1% based on PEGDA, and acetonitrile was used as a solvent. The additive solution was agitated for about 1 hour so that the ingredients introduced thereto might be mixed thoroughly. Then, the additive solution was added to the polymer solution and mixed therewith thoroughly. After that, 10 μL of commercially available ink for fountain pens (aqueous, Monami) was mixed with 1 mL of ethanol to prepare a dye solution. Then, 100 μL of the dye solution was added to the polymer solution, followed by agitation for 1 hour. The obtained polymer solution was applied to and coated on a release film by using a doctor blade. The coating gap was set to 800 μm and the coating rate was set to 20 mm/min. The release film coated with the solution was transferred to a glass plate, allowed to maintain level, dried overnight at room temperature, and vacuum dried at 100° C. for 12 hours. The obtained solid electrolyte film was disposed on a porous nonwoven web (porosity 87%, thickness 40 μm) and subjected to pressing by using a roll press at 60° C. so that the solid electrolyte film might be pressed into the porous nonwoven web. In this manner, a solid electrolyte membrane including a solid electrolyte film integrated with a porous nonwoven web was obtained. The solid electrolyte membrane had a thickness of about 50 μm and it was shown that the thickness was uniform over the whole surface of the solid electrolyte membrane.

Example 2

A solid electrolyte film and porous nonwoven web were prepared in the same manner as Example 1. The solid electrolyte film was disposed on a porous nonwoven web (porosity 87%, thickness 40 μm) and subjected to pressing by using a roll press at 25° C. so that the solid electrolyte film might be pressed into the porous nonwoven web. In this manner, a solid electrolyte membrane including a solid electrolyte film integrated with a porous nonwoven web was obtained. The solid electrolyte membrane had a thickness of about 50 μm.

Comparative Example 1

A solid electrolyte film (thickness 50 μm) was obtained in the same manner as Example 1, except that no dye reagent was used.

Comparative Example 2

A solid electrolyte film (thickness 50 μm) was obtained in the same manner as Example 2, except that no dye reagent was used.

Figure 2A:
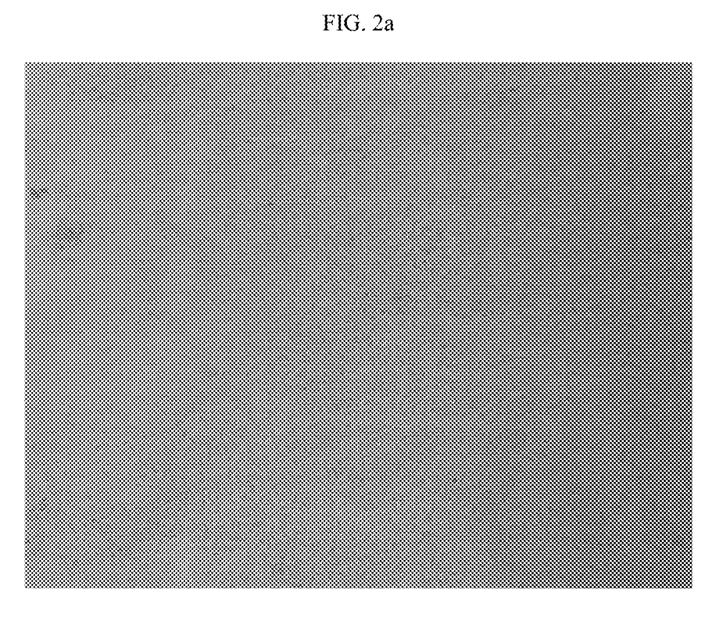
FIG. 2a shows the surface image of the solid electrolyte membrane obtained from Example 1.
Figure 2B:
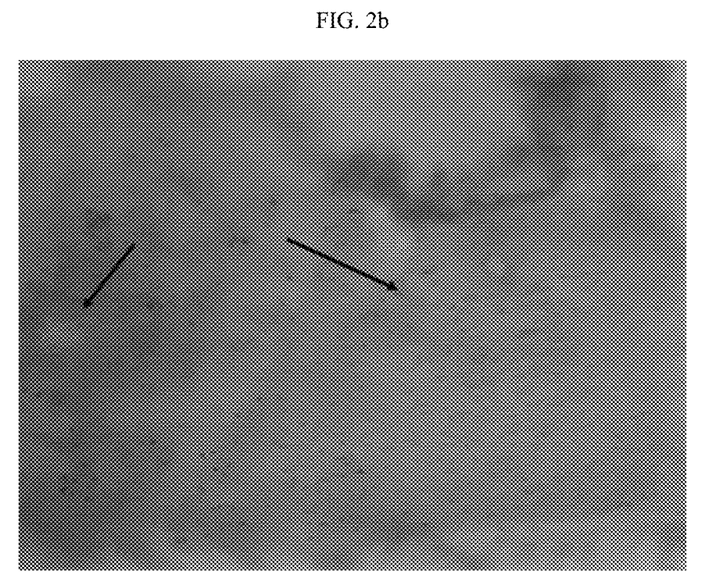
FIG. 2b shows the surface image of the solid electrolyte membrane obtained from Example 2.
Figure 3A:
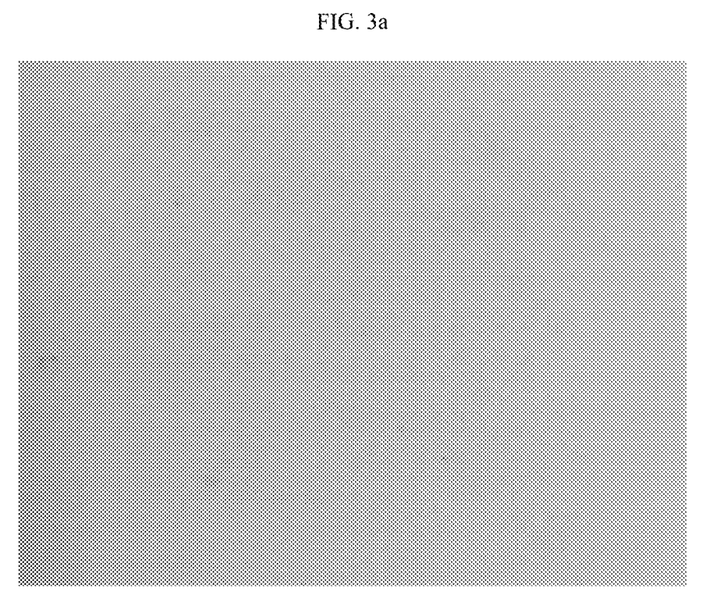
FIG. 3a shows the surface image of the solid electrolyte membrane obtained from Comparative Example 1.
Figure 3B:
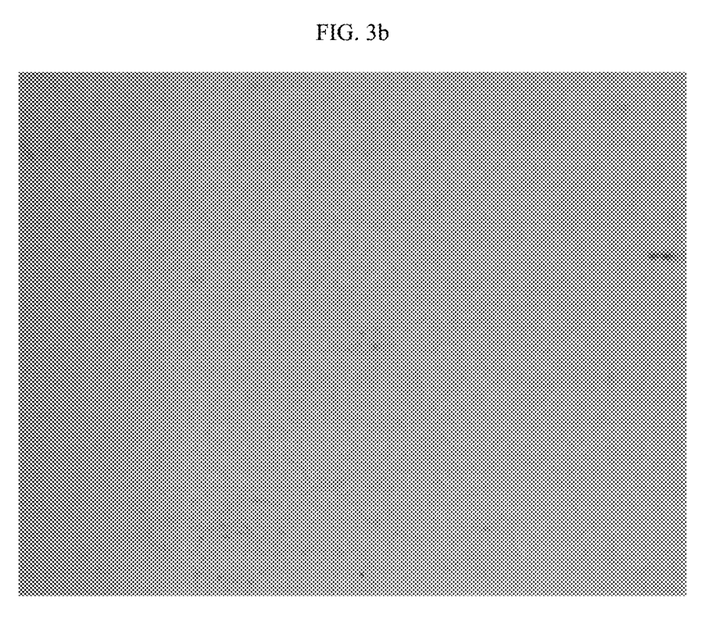
FIG. 3b shows the surface image of the solid electrolyte membrane obtained from Comparative Example 2.

When a solid electrolyte material is introduced into a porous substrate so that the porous substrate may be filled with the solid electrolyte material to improve the strength of a solid electrolyte membrane, it is possible to minimize loss of ion conductivity caused by addition of a separator only when the opposite side of the porous substrate as well as the pores in the porous substrate are filled sufficiently with the solid electrolyte material. When manufacturing a solid electrolyte membrane, it is not easy to determine whether or not a porous substrate, such as a nonwoven web, is filled compactly with a sufficient amount of solid electrolyte material by the naked eyes with no aid of an analyzer. FIG. 2a illustrates the surface image of the solid electrolyte membrane according to Example 1, and FIG. 2b illustrates the surface image of the solid electrolyte membrane according to Example 2. Referring to FIG. 2a and FIG. 2b, it can be seen easily by the naked eyes that the solid electrolyte membrane according to Example 1 includes a porous substrate filled with a solid electrolyte material more homogeneously and uniformly as compared to the solid electrolyte membrane according to Example 2. Thus, it is possible to determine the degree and state of the solid electrolyte material with which the separator is filled easily by the naked eyes through the introduction of the dye during the manufacture of the solid electrolyte membrane. Meanwhile, each of Comparative Example 1 (FIG. 3a) and Comparative Example 2 (FIG. 3b) includes no dye, and thus it is not easy to determine the degree and state of the solid electrolyte material with which the separator is filled. As a result, when a dye is introduced during the manufacture of a solid electrolyte membrane, it is possible to increase processability and yield.

What is claimed is:

1. A method for manufacturing a solid electrolyte membrane, comprising:
    (S10) preparing a porous polymer sheet and at least one solid electrolyte film,
    wherein the porous polymer sheet comprises a porous material comprising a plurality of pores, wherein the pores are capable of being penetrated through by flowable materials;
    (S20) disposing the solid electrolyte film on a surface of the porous polymer sheet; and
    (S30) carrying out pressurization in such a manner that the solid electrolyte film is pressed into the porous polymer sheet,
    wherein the solid electrolyte film comprises a mixture of a polymeric solid electrolyte with a dye, and
    wherein the polymeric solid electrolyte is formed by adding a polymer resin to a solvated lithium salt;
    the solid electrolyte material and the porous polymer sheet form a composite in such a manner that the pores of the porous polymer sheet are filled with a mixture of the solid electrolyte material with the dye, and
    wherein the porous polymer sheet is a nonwoven web,
    wherein an amount of the solid electrolyte material that is filled into the porous polymer sheet is determined by color development characteristics of the dye using a spectrochemical instrument.
2. The method for manufacturing the solid electrolyte membrane according to claim 1, wherein the solid electrolyte material comprises at least one selected from the group consisting of a polymeric solid electrolyte, an oxide-based solid electrolyte, and a sulfide-based solid electrolyte.

3. The method for manufacturing the solid electrolyte membrane according to claim 1, wherein the dye comprises at least one selected from the group consisting of a natural dye, a synthetic dye, and a fluorescence dye.

4. The method for manufacturing the solid electrolyte membrane according to claim 1, wherein the porous polymer sheet has a thickness of about 5 μm to 500 μm.

5. The method for manufacturing the solid electrolyte membrane according to claim 1, wherein the porous polymer sheet has a porosity of about 10% to 90%.

6. The method for manufacturing the solid electrolyte membrane according to claim 1, wherein the plurality of pores has a pore size within a range of 50 nm to 500 μm.

7. The method for manufacturing the solid electrolyte membrane according to claim 1, wherein the solid electrolyte membrane has a thickness of about 10 μm to 100 μm.

8. The method for manufacturing the solid electrolyte membrane according to claim 1, wherein the plurality of pores are interconnected with one another and penetrate through a substrate from one surface to another surface.

\* \* \* \* \*